United States Patent
Yang

(10) Patent No.: US 11,197,183 B2
(45) Date of Patent: Dec. 7, 2021

(54) MEASUREMENT METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Ning Yang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/461,748

(22) PCT Filed: Dec. 1, 2016

(86) PCT No.: PCT/CN2016/108284
§ 371 (c)(1),
(2) Date: May 16, 2019

(87) PCT Pub. No.: WO2018/098790
PCT Pub. Date: Jun. 7, 2018

(65) Prior Publication Data
US 2019/0364451 A1    Nov. 28, 2019

(51) Int. Cl.
*H04W 24/10*     (2009.01)
(52) U.S. Cl.
CPC .................................. *H04W 24/10* (2013.01)
(58) Field of Classification Search
CPC ..................................................... H04W 24/10
See application file for complete search history.

(56) References Cited

U.S. PATENT DOCUMENTS

2012/0094608 A1   4/2012   Shi
2013/0016613 A1   1/2013   Yada
(Continued)

FOREIGN PATENT DOCUMENTS

CN       101932045 A      12/2010
CN       101998482 A      3/2011
(Continued)

OTHER PUBLICATIONS

Supplementary European Search Report in European application No. 16922935.8, dated Oct. 18, 2019.
(Continued)

*Primary Examiner* — Mansour Oveissi
(74) *Attorney, Agent, or Firm* — Ladas & Parry LLP

(57) ABSTRACT

Disclosed in the present invention are a measurement method, a terminal device, and a network device. The method comprises: a terminal device receives measurement configuration information sent by a network device, the measurement configuration information comprising multiple measurement object categories to be measured; the terminal device measures multiple measurement objects belonging to the multiple measurement object categories according to the measurement configuration information; and the terminal device sends a measurement reports to the network device, the measurement report comprising measurement results of measurement objects satisfying a reporting condition among the multiple measurement objects. In this way, the network device can obtain measurement information of multiple measurement objects one time, thereby satisfying the demand for high-performance wireless resource management.

20 Claims, 3 Drawing Sheets

(56) References Cited

U.S. PATENT DOCUMENTS

| | | | |
|---|---|---|---|
| 2013/0308489 A1 | 11/2013 | Malgorzata | |
| 2016/0344485 A1 | 11/2016 | Yao et al. | |
| 2017/0142746 A1* | 5/2017 | Koorapaty | H04W 16/14 |
| 2019/0327629 A1* | 10/2019 | Zhang | H04B 7/0626 |

FOREIGN PATENT DOCUMENTS

| | | |
|---|---|---|
| CN | 102215526 A | 10/2011 |
| CN | 103096358 A | 5/2013 |
| CN | 105830495 A | 8/2016 |
| CN | 106060280 A | 10/2016 |
| CN | 106063178 A | 10/2016 |
| EP | 2448312 A1 | 5/2012 |
| EP | 2541982 A1 | 1/2013 |
| EP | 3499735 A1 | 6/2019 |
| JP | 2013524657 A | 6/2013 |
| RU | 2524682 C2 | 8/2014 |
| WO | 2008136415 A1 | 11/2008 |
| WO | 2012105167 A1 | 8/2012 |
| WO | 2014141650 A1 | 9/2014 |
| WO | 2016021642 A1 | 2/2016 |
| WO | 2016119166 A1 | 8/2016 |
| WO | 2016167559 A1 | 10/2016 |

OTHER PUBLICATIONS

English translation of the Written Opinion of the International Search Authority in the international application No. PCT/CN2016/108284, dated Jul. 28, 2017.

"3rd Generation Partnership Project; Technical Specification Group Radio Access Network; Evolved Universal Terrestrial Radio Access(E-UTRA); Radio Resource Control (RRC); Protocol specification (Release 14)", 3GPP Standard; 3GPP TS 36.331, 3rd Generation Partnership PROJECT(3GPP), Mobie Competence Centre; 650, Route Des Lucioles; F-06921 Sophia-Antipolis Cedex; France, vol. Ran WG2, No. V14.0.0, Oct. 4, 2016(Oct. 4, 2016), pp. 1-644, XP051172918.

International Search Report in international application No. PCT/CN2016/108284, dated July 28, 2017.

Written Opinion of the International Search Authority in international application No. PCT/CN2016/108284, dated Jul. 28, 2017.

First Office Action of the Chinese spplication No. 201680090671 9, dated Apr. 26, 2020.

Second Office Action of ths Chinese application No. 201680090671.9, dated Jun. 18, 2020.

First Office Action of the Russian application No. 2019118751, dated Apr. 15, 2020.

First Office Action of the Singaporean applicaton No. 11201904607S, dated Jun. 6, 2020.

First Office Action of the Canadan applcation No. 3043953, dated Jun. 15, 2020.

ZTE, ZTE Micrelectronics, Consideraon on the RRM Measurement for NR, 3GPP TSG-RAN WG2 Meeting #96 , R2-167836 Reno, USA, Nov. 14-18, 2016.

Samsung, Cell Quality Derivation based on Measurements from Individual Beams, 3GPP TSG RAN WG2 #96 R2-168042 Reno, USA, Nov. 14-18, 2016.

Intel Corporation, Measasrements in NR, 3GPP TSG RAN WG2 Meetina #96 R2-160511 Reno, Nevada, Nov. 14-18, 2016.

First Office Action of the European application No. 16922935.8, dated Aug. 6, 2020.

First Office Action of the Indian application No. 201917021466, dated Jan. 29, 2021.

First Office Action of the Israel application No. 266716, dated Dec. 10, 2020.

First Office Action of the Brazilian appliestion No. BR1120190104623, dated Sep. 15, 2020.

First Office Action of the Japanese application No. 2019-527825, dated Nov. 20, 2020.

Office Action of the Taiwanese application No. 106141712, dated May 4, 2021.

First Office Action of the Indonesian application No. P00201905499, dated Jun. 24, 2021.

AT & T, RRM Measurements for NR [online], 3GPP TSG RAN WG1 #87 R1-1612364, Internet: <URL:http://www.3gpp.org/ftp/tsg_ran/WG1_RL1/TSGR1_87/Docs/R1-1612364.zip>, Nov. 5, 2016.

Nokia, Alcatel-Lucent Shanghai Bell, Beam measurements in NR [online], 3GPP TSG RAN WG4 #81 R4-1609327, Internet: <URL: http://www.3gpp.org/ftp/tsg_ran/WG4_Radio/TSGR4_81/Docs/R4-1609327.zip>, Nov. 4, 2016.

Second Office Action of the Japanese application No. 2019-527825, dated Jul. 30, 2021.

Office Action of the Australian application No. 2016431367, dated Sep. 8, 2021.

Supplementary European Search Report in the European application No. 21176924.5, dated Sep. 24, 2021.

Notice of Re Examination of the Taiwanese application No. 106141712, dated Sep. 22, 2021.

* cited by examiner

MEASUREMENT METHOD, TERMINAL DEVICE, AND NETWORK DEVICE

RELATED APPLICATION

This application is an application under 35 U.S.C. 371 of International Application No. PCT/CN2016/108284 filed on Dec. 1, 2016, the entire contents of which are incorporated herein by reference.

TECHNICAL FIELD

Embodiments of the disclosure relate to the field of wireless communication, and more particularly, to a measurement method, a terminal device and a network device.

BACKGROUND

Measurement in a Long Term Evolution (LTE) system mainly refers to mobility measurement in a connected state. After a network device transmits measurement configuration information to a terminal device, the terminal device may detect a signal state of a neighbor cell according to a configuration parameter, such as a measurement object and a measurement reporting condition, indicated in the measurement configuration information, or read a system information content of the neighbor cell according to an indication of the network device and fill in and feed back measurement reporting information to the network device for cell handover or neighbor cell classification relationship list perfection of the network device. However, in a future 5th-Generation (5G) communication system, a network device has increasing demands in measurement information and a high-performance radio resource management requirement may not be met in an existing measurement manner.

SUMMARY

The embodiments of the disclosure provide a measurement method, a terminal device and a network device. The terminal device may provide measurement information of measurement objects of multiple classifications for the network device and a high-performance radio resource management requirement is met.

A first aspect provides a measurement method, which is characterized by including that: a terminal device receives measurement configuration information sent by a network device, the measurement configuration information including multiple measurement object classifications to be measured; the terminal device measures multiple measurement objects belonging to the multiple measurement object classifications according to the measurement configuration information; and the terminal device sends a measurement report to the network device, the measurement report including measurement results of measurement objects, each of which satisfies a reporting condition, of the multiple measurement objects.

In the embodiments of the disclosure, the terminal device reports measurement results of evaluated measurement objects of multiple classifications to the network device, thereby providing rich auxiliary information for the network device and meeting a high-performance radio resource management requirement.

The measurement configuration information may include, for example, at least one of the multiple measurement object classifications, a measurement type (or called a measurement quantity) and reporting conditions corresponding to the multiple measurement object classifications respectively. In addition, another parameter such as a measurement Identity (ID), a measurement gap, a measurement starting threshold value and a speed state parameter may further be included.

Optionally, in an implementation mode of the first aspect, the measurement configuration information may further include multiple measurement conditions each corresponding to a measurement object classification, and the operation that the terminal device measures the multiple measurement objects each belonging to a measurement object classification according to the measurement configuration information may include that: the terminal device determines that each of the multiple measurement objects satisfies the measurement condition corresponding to the measurement object classification to which the measurement object belongs; and the terminal device measures the multiple measurement objects.

That is, the multiple measurement objects meet the measurement conditions corresponding to the measurement object classifications to which the multiple measurement objects belong respectively.

Optionally, in an implementation mode of the first aspect, the measurement configuration information may further include multiple reporting conditions each corresponding to a measurement object classification, and before the operation that the terminal device sends the measurement report to the network device, the method may further include that: the terminal device generates the measurement report according to measurement results of the multiple measurement objects and the multiple reporting conditions each corresponding to a measurement object classification.

Optionally, in an implementation mode of the first aspect, the operation that the terminal device generates the measurement report according to the measurement results of the multiple measurement objects and the multiple reporting conditions each corresponding to a measurement object classification may include that: the terminal device determines a present measurement object classification to be written into the measurement report according to the measurement results of the multiple measurement objects and a sequence of the multiple measurement object classifications; whether the measurement result of the measurement object belonging to the present measurement object classification meets the reporting condition corresponding to the present measurement object classification is determined; if the measurement result of the measurement object of the present measurement object classification meets the reporting condition corresponding to the present measurement object classification, the terminal device writes the measurement result of the measurement object of the present measurement object classification into the measurement report, determines the next measurement object classification according to the sequence and determines whether the measurement result of the measurement object belonging to the next measurement object classification meets the reporting condition corresponding to the next measurement object class; and if the measurement result of the measurement object of the present measurement object classification does not meet the reporting condition corresponding to the present measurement object classification, the terminal device stops filling the measurement report.

Herein, the reporting condition may be divided into, for example, three classifications of event-triggered reporting, periodically-triggered reporting and event-triggered periodic reporting. The reporting condition indicating event-triggered reporting may include the measurement classification and the threshold value. The reporting condition indicating periodically-triggered reporting may include a reporting period and a periodic triggering purpose. The reporting condition indicating event-triggered periodic reporting may include the measurement classification, the threshold value and a duration when the threshold value is kept met.

Optionally, in an implementation mode of the first aspect, the reporting condition corresponding to the present measurement object classification may include at least one of: the measurement result of the measurement object of the present measurement object classification is higher than a first preset threshold, or the measurement result of the measurement object of the present measurement object classification is kept higher than the first preset threshold for a first preset duration; the measurement result of the measurement object of the present measurement object classification is lower than a second preset threshold, or the measurement result of the measurement object of the present measurement object classification is kept lower than the second preset threshold for a second preset duration; the measurement result of the measurement result of the present measurement object classification is within a preset range, or the measurement result of the measurement object of the present measurement object classification is kept within the preset range for a third preset duration; n measurement objects, that have highest measurement results, of multiple measurement objects of the present measurement object classification each is taken as the measurement object of the present measurement object classification, or n measurement objects, that have highest measurement results for a fourth preset duration, of multiple measurement objects of the present measurement object classification each is taken as the measurement object of the present measurement object classification, n being a positive integer; m measurement objects, that have lowest measurement results, of multiple measurement objects of the present measurement object classification each is taken as the measurement object of the present measurement object classification, or m measurement objects, that have lowest measurement results for a fifth preset duration, of multiple measurement objects of the present measurement object classification each is taken as the measurement object of the present measurement object classification; and a sending moment of the measurement report meets a preset reporting period.

Optionally, in an implementation mode of the first aspect, the reporting condition corresponding to the next measurement object classification may include at least one of: the terminal device is able to obtain a measurement result of a measurement object of a next measurement object classification by measurement; the measurement result of the measurement object of the next measurement object classification is higher than the first preset threshold, or the measurement result of the measurement object of the next measurement object classification is kept higher than the first preset threshold for the first preset duration; the measurement result of the measurement object of the next measurement object classification is lower than the second preset threshold, or the measurement result of the measurement object of the next measurement object classification is kept lower than the second preset threshold for the second preset duration; the measurement result of the measurement result of the next measurement object classification is within the preset range, or the measurement result of the measurement object of the next measurement object classification is kept within the preset range for the third preset duration; n measurement objects, that have highest measurement results, of multiple measurement objects of the next measurement object classification each is taken as the measurement object of the next measurement object classification, or n measurement objects, that have highest measurement results for a fourth preset duration, of multiple measurement objects of the next measurement object classification each is taken as the measurement object of the next measurement object classification; and m measurement objects, that have lowest measurement results, of multiple measurement objects of the next measurement object classification each is taken as the measurement object of the next measurement object classification, or m measurement objects, that have lowest measurement results for a fifth preset duration, of multiple measurement objects of the next measurement object classification each is taken as the measurement object of the next measurement object classification.

Any two measurement object classifications in the multiple measurement object classifications are taken as an example. The terminal device evaluates the multiple measurement object classifications according to the sequence of the multiple measurement object classifications. At first, whether to report the measurement object belonging to a first measurement object class is determined.

If the measurement result of the measurement object belonging to the first measurement object classification meets the reporting condition corresponding to the first measurement object classification, the terminal device writes the measurement result of the measurement object belonging to the first measurement object classification into the measurement report and judges (or evaluates) whether the measurement object belonging to a second measurement object classification meets the reporting condition corresponding to the second measurement object class. If the measurement object belonging to the second measurement object classification meets the reporting condition corresponding to the second measurement object classification, the terminal device writes the measurement result of the measurement object of the second measurement object classification into the measurement report.

If the terminal device, after evaluating the measurement object belonging to the first measurement object classification, determines that the measurement result of the measurement object of the first measurement object classification does not meet the reporting condition corresponding to the first measurement object classification, the terminal device may not write the measurement result of the measurement object of the first measurement object classification into the measurement report and may not continue evaluating the measurement object of the second measurement object classification.

That is, no matter whether the measurement object belonging to the second measurement object classification meets the reporting condition corresponding to the second measurement object class, the terminal device may not evaluate the measurement object belonging to the second measurement object classification as long as the measurement result of the measurement object belonging to the first measurement object classification does not meet the reporting condition corresponding to the first measurement object classification.

The terminal device sequentially evaluates the measurement results of the multiple measurement objects each belonging to a measurement object classification in the abovementioned manner according to the sequence of the multiple measurement object classifications until the measurement results of the measurement objects meeting the conditions are all written into the measurement report, thereby sending the measurement report to the network device.

Two measurement object classifications are taken as an example. There is made such a hypothesis that the multiple measurement object classifications include a measurement object classification A and a measurement object classification B and the measurement object classification A is before the measurement object classification B. Then, when a measurement result, obtained by measurement, of the measurement object classification A meets a requirement of a preset threshold A and a measurement result, obtained by measurement, of the measurement object classification B meets a requirement of a preset threshold B, the terminal device reports the measurement results of the measurement object classification A and the measurement object classification B to the network device. Or, when the measurement result of the measurement object classification A keeps meeting the requirement of the preset threshold A for a certain time T1 and the measurement result of the measurement object classification B meets the requirement of the preset threshold B, the terminal device reports the measurement results of the measurement object classification A and the measurement object classification B to the network device. When a measurement result, obtained by measurement, of a certain object A meets a preconfigured condition A and a measurement result, obtained by measurement, of another object B keeps meeting a preconfigured condition B for a certain time T2, the terminal reports the measurement results of A and B to the network device. Or, when the measurement result of the measurement object classification A keeps meeting the requirement of the preset threshold A for a certain time T1 and the measurement result of the measurement object classification B keeps meeting the requirement of the preset threshold B for a certain time T2, the terminal device reports the measurement results of the measurement object classification A and the measurement object classification B to the network device.

Optionally, in an implementation mode of the first aspect, the multiple measurement object classifications may include at least two of: a network device, a frequency point, a cell or a beam.

Herein, the network device includes, but not limited to, a base station, a Transmission Reference Point (TRP) and the like.

Optionally, in an implementation mode of the first aspect, measurement may include at least one of: received signal power measurement, received signal quality measurement, received signal strength measurement or signal interference level measurement.

Optionally, in an implementation mode of the first aspect, the operation that the terminal device receives the measurement configuration information sent by the network device may include that: the terminal device receives the measurement configuration information sent by the network device through a Radio Resource Control (RRC) layer, a Medium Access Control (MAC) layer or a physical layer.

A second aspect provides a terminal device, which may be configured to execute each process executed by the terminal device in the measurement method in the first aspect and each implementation mode. The terminal device may include a receiving unit, a measurement unit and a sending unit.

The receiving unit may be configured to receive measurement configuration information sent by a network device, the measurement configuration information including multiple measurement object classifications to be measured.

The measurement unit may be configured to measure multiple measurement objects belonging to the multiple measurement object classifications according to the measurement configuration information.

The sending unit may be configured to send a measurement report to the network device, the measurement report including measurement results of measurement objects, each of which satisfies a reporting condition, of the multiple measurement objects.

In such a manner, the terminal device reports measurement results of evaluated measurement objects of multiple classifications to the network device, thereby providing rich auxiliary information for the network device and meeting a high-performance radio resource management requirement.

Optionally, in an implementation mode of the second aspect, the measurement configuration information may further include multiple measurement conditions each corresponding to a measurement object classification, and the measurement unit may specifically be configured to determine that each of the multiple measurement objects satisfies the measurement condition corresponding to the measurement object classification to which the measurement object belongs and measure the multiple measurement objects.

Optionally, in an implementation mode of the second aspect, the measurement configuration information may further include multiple reporting conditions each corresponding to a measurement object classification, and the measurement unit may further be configured to, before the sending unit sends the measurement report to the network device, generate the measurement report according to measurement results of the multiple measurement objects and the multiple reporting conditions each corresponding to a measurement object classification.

Optionally, in an implementation mode of the second aspect, the measurement unit may specifically be configured to: determine a present measurement object classification to be written into the measurement report according to the measurement results of the multiple measurement objects and a sequence of the multiple measurement object classifications; determine whether the measurement result of the measurement object belonging to the present measurement object classification meets the reporting condition corresponding to the present measurement object classification; if the measurement result of the measurement object of the present measurement object classification meets the reporting condition corresponding to the present measurement object classification, by the terminal device, write the measurement result of the measurement object of the present measurement object classification into the measurement report, determine the next measurement object classification according to the sequence and determine whether the measurement result of the measurement object belonging to the next measurement object classification meets the reporting condition corresponding to the next measurement object class; and if the measurement result of the measurement object of the present measurement object classification does not meet the reporting condition corresponding to the present measurement object classification, stop filling, by the terminal device, the measurement report.

Optionally, in an implementation mode of the second aspect, the reporting condition corresponding to the present measurement object classification may include at least one of: the measurement result of the measurement object of the present measurement object classification is higher than a first preset threshold, or the measurement result of the measurement object of the present measurement object classification is kept higher than the first preset threshold for a first preset duration; the measurement result of the measurement object of the present measurement object classification is lower than a second preset threshold, or the measurement result of the measurement object of the present measurement object classification is kept lower than the second preset threshold for a second preset duration; the measurement result of the measurement result of the present measurement object classification is within a preset range, or the measurement result of the measurement object of the present measurement object classification is kept within the preset range for a third preset duration; n measurement objects, that have highest measurement results, of multiple measurement objects of the present measurement object classification each is taken as the measurement object of the present measurement object classification, or n measurement objects, that have highest measurement results for a fourth preset duration, of multiple measurement objects of the present measurement object classification each is taken as the measurement object of the present measurement object classification, n being a positive integer; m measurement objects, that have lowest measurement results, of multiple measurement objects of the present measurement object classification each is taken as the measurement object of the present measurement object classification, or m measurement objects, that have lowest measurement results for a fifth preset duration, of multiple measurement objects of the present measurement object classification each is taken as the measurement object of the present measurement object classification; and a sending moment of the measurement report meets a preset reporting period.

Optionally, in an implementation mode of the second aspect, the reporting condition corresponding to the next measurement object classification may include at least one of: the terminal device is able to obtain a measurement result of a measurement object of a next measurement object classification by measurement; the measurement result of the measurement object of the next measurement object classification is higher than the first preset threshold, or the measurement result of the measurement object of the next measurement object classification is kept higher than the first preset threshold for the first preset duration; the measurement result of the measurement object of the next measurement object classification is lower than the second preset threshold, or the measurement result of the measurement object of the next measurement object classification is kept lower than the second preset threshold for the second preset duration; the measurement result of the measurement result of the next measurement object classification is within the preset range, or the measurement result of the measurement object of the next measurement object classification is kept within the preset range for the third preset duration; n measurement objects, that have highest measurement results, of multiple measurement objects of the next measurement object classification each is taken as the measurement object of the next measurement object classification, or n measurement objects, that have highest measurement results for a fourth preset duration, of multiple measurement objects of the next measurement object classification each is taken as the measurement object of the next measurement object classification; and m measurement objects, that have lowest measurement results, of multiple measurement objects of the next measurement object classification each is taken as the measurement object of the next measurement object classification, or m measurement objects, that have lowest measurement results for a fifth preset duration, of multiple measurement objects of the next measurement object classification each is taken as the measurement object of the next measurement object classification.

Optionally, in an implementation mode of the second aspect, the multiple measurement object classifications may include at least two of: a network device, a frequency point, a cell or a beam.

Optionally, in an implementation mode of the second aspect, measurement may include at least one of: received signal power measurement, received signal quality measurement, received signal strength measurement or signal interference level measurement.

Optionally, in an implementation mode of the second aspect, the receiving unit may specifically be configured to receive the measurement configuration information sent by the network device through an RRC layer, a MAC layer or a physical layer.

A third aspect provides a terminal device, which may be configured to execute each process executed by the terminal device in the measurement method in the first aspect and each implementation mode. The terminal device includes a processor, a receiver and a sender. The receiver is configured to receive measurement configuration information sent by a network device, the measurement configuration information including multiple measurement object classifications to be measured. The processor measures multiple measurement objects belonging to the multiple measurement object classifications according to the measurement configuration information. The sender is configured to send a measurement report to the network device, the measurement report including measurement results of measurement objects, each of which satisfies a reporting condition, of the multiple measurement objects.

A fourth aspect provides a computer-readable storage medium, which stores a program, the program enabling a terminal device to execute any measurement method in the first aspect and each implementation mode thereof.

A fifth aspect provides a measurement method, which may include that: a network device sends measurement configuration information to a terminal device, the measurement configuration information including multiple measurement object classifications to be measured, to enable the terminal device to measure multiple measurement objects belonging to the multiple measurement object classifications according to the measurement configuration information; and the network device receives a measurement report sent by the terminal device, the measurement report including measurement results of measurement objects, each of which satisfies a reporting condition, of the multiple measurement objects.

In the embodiments of the disclosure, the network device receives measurement results of multiple evaluated measurement object classifications from the terminal device, thereby obtaining rich auxiliary information and meeting a high-performance radio resource management requirement.

Optionally, in an implementation mode of the fifth aspect, the measurement configuration information may further include multiple measurement conditions each corresponding to a measurement object classification, and the multiple measurement objects may meet the measurement conditions corresponding to the respective measurement object classifications of the multiple measurement objects.

Optionally, in an implementation mode of the fifth aspect, the measurement configuration information may further include multiple reporting conditions each corresponding to a measurement object classification to enable the terminal device to, before sending the measurement report to the network device, generate the measurement report according to measurement results of the multiple measurement objects and the multiple reporting conditions each corresponding to a measurement object classification.

Optionally, in an implementation mode of the fifth aspect, the multiple measurement object classifications may meet a preset sequence, and the sequence may be configured for the terminal device to determine a present measurement object classification to be written into the measurement report according to the measurement results of the multiple measurement objects and the sequence of the multiple measurement object classifications and determine whether the measurement result of the measurement object belonging to the present measurement object classification meets the reporting condition corresponding to the present measurement object classification; if the measurement result of the measurement object of the present measurement object classification meets the reporting condition corresponding to the present measurement object classification, the measurement report may include the measurement result of the measurement object of the present measurement object classification, and the sequence may further be configured for the terminal device to determine whether the measurement result of the measurement object of the next measurement object classification meets the reporting condition corresponding to the next measurement object class; and if the measurement result of the measurement object of the present measurement object classification does not meet the reporting condition corresponding to the present measurement object classification, the measurement report may not include the measurement result of the measurement object of the present measurement object classification, and the sequence may further be configured for the terminal device to stop filling the measurement report.

Optionally, in an implementation mode of the fifth aspect, the reporting condition corresponding to the present measurement object classification may include at least one of: the measurement result of the measurement object of the present measurement object classification is higher than a first preset threshold, or the measurement result of the measurement object of the present measurement object classification is kept higher than the first preset threshold for a first preset duration; the measurement result of the measurement object of the present measurement object classification is lower than a second preset threshold, or the measurement result of the measurement object of the present measurement object classification is kept lower than the second preset threshold for a second preset duration; the measurement result of the measurement result of the present measurement object classification is within a preset range, or the measurement result of the measurement object of the present measurement object classification is kept within the preset range for a third preset duration; n measurement objects, that have highest measurement results, of multiple measurement objects of the present measurement object classification each is taken as the measurement object of the present measurement object classification, or n measurement objects, that have highest measurement results for a fourth preset duration, of multiple measurement objects of the present measurement object classification each is taken as the measurement object of the present measurement object classification, n being a positive integer; m measurement objects, that have lowest measurement results, of multiple measurement objects of the present measurement object classification each is taken as the measurement object of the present measurement object classification, or m measurement objects, that have lowest measurement results for a fifth preset duration, of multiple measurement objects of the present measurement object classification each is taken as the measurement object of the present measurement object classification; and a sending moment of the measurement report meets a preset reporting period.

Optionally, in an implementation mode of the fifth aspect, the reporting condition corresponding to the next measurement object classification may include at least one of: the terminal device is able to obtain a measurement result of a measurement object of a next measurement object classification by measurement; the measurement result of the measurement object of the next measurement object classification is higher than the first preset threshold, or the measurement result of the measurement object of the next measurement object classification is kept higher than the first preset threshold for the first preset duration; the measurement result of the measurement object of the next measurement object classification is lower than the second preset threshold, or the measurement result of the measurement object of the next measurement object classification is kept lower than the second preset threshold for the second preset duration; the measurement result of the measurement result of the next measurement object classification is within the preset range, or the measurement result of the measurement object of the next measurement object classification is kept within the preset range for the third preset duration; n measurement objects, that have highest measurement results, of multiple measurement objects of the next measurement object classification each is taken as the measurement object of the next measurement object classification, or n measurement objects, that have highest measurement results for a fourth preset duration, of multiple measurement objects of the next measurement object classification each is taken as the measurement object of the next measurement object classification; and m measurement objects, that have lowest measurement results, of multiple measurement objects of the next measurement object classification each is taken as the measurement object of the next measurement object classification, or m measurement objects, that have lowest measurement results for a fifth preset duration, of multiple measurement objects of the next measurement object classification each is taken as the measurement object of the next measurement object classification.

Optionally, in an implementation mode of the fifth aspect, the multiple measurement object classifications may include at least two of: a network device, a frequency point, a cell or a beam.

Optionally, in an implementation mode of the fifth aspect, measurement may include at least one of: received power measurement, received signal quality measurement, received signal strength measurement or signal interference level measurement.

Optionally, in an implementation mode of the fifth aspect, the operation that the network device sends the measurement configuration information to the terminal device may include that: the network device sends the measurement configuration information to the terminal device through an RRC layer, a MAC layer or a physical layer.

A sixth aspect provides a network device, which may be configured to execute each process executed by the network device in the measurement method in the fifth aspect and each implementation mode. The network device may include a sending unit and a receiving unit.

The sending unit may be configured to send measurement configuration information to a terminal device, the measurement configuration information including multiple measurement object classifications to be measured, to enable the terminal device to measure multiple measurement objects belonging to the multiple measurement object classifications according to the measurement configuration information.

The receiving unit may be configured to receive a measurement report sent by the terminal device, the measurement report including measurement results of measurement objects, each of which satisfies a reporting condition, of the multiple measurement objects.

Optionally, in an implementation mode of the sixth aspect, the measurement configuration information may further include multiple measurement conditions each corresponding to a measurement object classification, and the multiple measurement objects may meet the measurement conditions corresponding to the respective measurement object classifications of the multiple measurement objects.

Optionally, in an implementation mode of the sixth aspect, the measurement configuration information may further include multiple reporting conditions each corresponding to a measurement object classification to enable the terminal device to, before sending the measurement report to the network device, generate the measurement report according to measurement results of the multiple measurement objects and the multiple reporting conditions each corresponding to a measurement object classification.

Optionally, in an implementation mode of the sixth aspect, the multiple measurement object classifications may meet a preset sequence, and the sequence may be configured for the terminal device to determine a present measurement object classification to be written into the measurement report according to the measurement results of the multiple measurement objects and the sequence of the multiple measurement object classifications and determine whether the measurement result of the measurement object belonging to the present measurement object classification meets the reporting condition corresponding to the present measurement object classification; if the measurement result of the measurement object of the present measurement object classification meets the reporting condition corresponding to the present measurement object classification, the measurement report may include the measurement result of the measurement object of the present measurement object classification, and the sequence may further be configured for the terminal device to determine whether the measurement result of the measurement object of the next measurement object classification meets the reporting condition corresponding to the next measurement object class; and if the measurement result of the measurement object of the present measurement object classification does not meet the reporting condition corresponding to the present measurement object classification, the measurement report may not include the measurement result of the measurement object of the present measurement object classification, and the sequence may further be configured for the terminal device to stop filling the measurement report.

Optionally, in an implementation mode of the sixth aspect, the reporting condition corresponding to the present measurement object classification may include at least one of: the measurement result of the measurement object of the present measurement object classification is higher than a first preset threshold, or the measurement result of the measurement object of the present measurement object classification is kept higher than the first preset threshold for a first preset duration; the measurement result of the measurement object of the present measurement object classification is lower than a second preset threshold, or the measurement result of the measurement object of the present measurement object classification is kept lower than the second preset threshold for a second preset duration; the measurement result of the measurement result of the present measurement object classification is within a preset range, or the measurement result of the measurement object of the present measurement object classification is kept within the preset range for a third preset duration; n measurement objects, that have highest measurement results, of multiple measurement objects of the present measurement object classification each is taken as the measurement object of the present measurement object classification, or n measurement objects, that have highest measurement results for a fourth preset duration, of multiple measurement objects of the present measurement object classification each is taken as the measurement object of the present measurement object classification, n being a positive integer; m measurement objects, that have lowest measurement results, of multiple measurement objects of the present measurement object classification each is taken as the measurement object of the present measurement object classification, or m measurement objects, that have lowest measurement results for a fifth preset duration, of multiple measurement objects of the present measurement object classification each is taken as the measurement object of the present measurement object classification; and a sending moment of the measurement report meets a preset reporting period.

Optionally, in an implementation mode of the sixth aspect, the reporting condition corresponding to the next measurement object classification may include at least one of: the terminal device is able to obtain a measurement result of a measurement object of a next measurement object classification by measurement; the measurement result of the measurement object of the next measurement object classification is higher than the first preset threshold, or the measurement result of the measurement object of the next measurement object classification is kept higher than the first preset threshold for the first preset duration; the measurement result of the measurement object of the next measurement object classification is lower than the second preset threshold, or the measurement result of the measurement object of the next measurement object classification is kept lower than the second preset threshold for the second preset duration; the measurement result of the measurement result of the next measurement object classification is within the preset range, or the measurement result of the measurement object of the next measurement object classification is kept within the preset range for the third preset duration; n measurement objects, that have highest measurement results, of multiple measurement objects of the next measurement object classification each is taken as the measurement object of the next measurement object classification, or n measurement objects, that have highest measurement results for a fourth preset duration, of multiple measurement objects of the next measurement object classification each is taken as the measurement object of the next measurement object classification; and m measurement objects, that have lowest measurement results, of multiple measurement objects of the next measurement object classification each is taken as the measurement object of the next measurement object classification, or m measurement objects, that have lowest measurement results for a fifth preset duration, of multiple measurement objects of the next measurement object classification each is taken as the measurement object of the next measurement object classification.

Optionally, in an implementation mode of the sixth aspect, the multiple measurement object classifications may include at least two of: a network device, a frequency point, a cell or a beam.

Optionally, in an implementation mode of the sixth aspect, measurement may include at least one of: received power measurement, received signal quality measurement, received signal strength measurement or signal interference level measurement.

Optionally, in an implementation mode of the sixth aspect, the sending unit may specifically be configured to send the measurement configuration information to the terminal device through an RRC layer, a MAC layer or a physical layer.

A seventh aspect provides a network device, which may be configured to execute each process executed by the network device in the measurement method in the fifth aspect and each implementation mode. The network device includes a processor, a receiver and a sender. The sender is configured to send measurement configuration information to a terminal device, the measurement configuration information including multiple measurement object classifications to be measured, to enable the terminal device to measure multiple measurement objects belonging to the multiple measurement object classifications according to the measurement configuration information. The receiver is configured to receive a measurement report sent by the terminal device, the measurement report including measurement results of measurement objects, each of which satisfies a reporting condition, of the multiple measurement objects.

An eighth aspect provides a computer-readable storage medium, which stores a program, the program enabling a network device to execute any measurement method in the fifth aspect and each implementation mode thereof.

On the basis of the measurement method of the embodiments of the disclosure, the terminal device reports the measurement results of the evaluated measurement objects of the multiple classifications to the network device, thereby providing rich auxiliary information for the network device and meeting the high-performance radio resource management requirement.

DETAILED DESCRIPTION

The technical solutions in the embodiments of the disclosure will be described below in combination with the drawings.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, an LTE system, an LTE Frequency Division Duplex (FDD) system, LTE Time Division Duplex (TDD), a Universal Mobile Telecommunication System (UMTS) or a future 5G communication system.

Each embodiment of the disclosure is described in combination with a terminal device. The terminal device may also refer to User Equipment (UE), an access terminal, a user unit, a user station, a mobile radio station, a mobile station, a remote station, a remote terminal, a mobile device, a user terminal, a terminal, a wireless communication device, a user agent, a user device or the like. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in a future 5G network, a terminal device in a future evolved Public Land Mobile Network (PLMN) or the like.

Each embodiment of the disclosure is described in combination with a network device. The network device may be a device configured to communicate with the terminal device, for example, may be a Base Transceiver Station (BTS) in the GSM or the CDMA, may also be a NodeB (NB) in the WCDMA system and may also be an Evolutional Node B (eNB or eNodeB) in the LTE system. Or the network device may be a relay station, an access point, a vehicle-mounted device, a wearable device, a network-side device in the future 5G network, a network device in the future evolved PLMN or the like.

Figure 1:
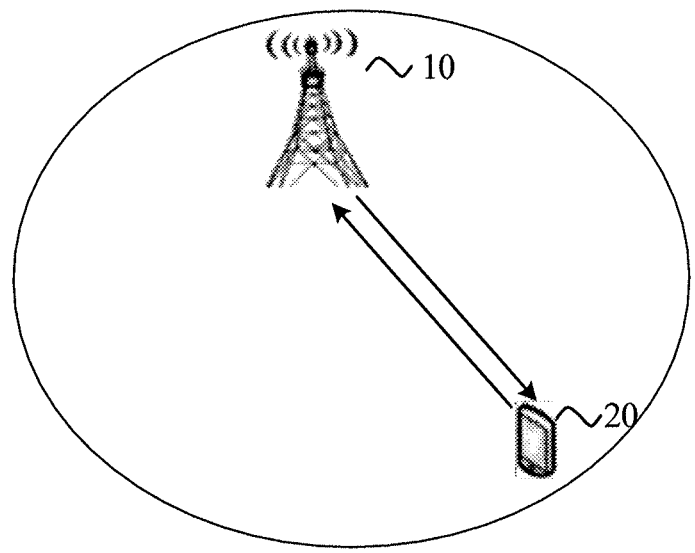
FIG. 1 is a schematic architecture diagram of an application scenario according to an embodiment of the disclosure.

FIG. 1 is a schematic diagram of an application scenario according to an embodiment of the disclosure. A communication system in FIG. 1 may include a network device 10 and a terminal device 20. The network device 10 is configured to provide communication service for the terminal device 20 for access to a core network. The terminal device 20 searches a synchronization signal, broadcast signal and the like sent by the network device 10 to access the network, thereby communicating with the network. Arrows shown in FIG. 1 may represent uplink/downlink transmission implemented through a cellular link between the terminal device 20 and the network device 10.

A network in the embodiments of the disclosure may refer to a PLMN or a Device to Device (D2D) network or a Machine to Machine/Man (M2M) network or another network. FIG. 1 is only an exemplary simplified schematic diagram. The network may further include another terminal device which is not presented in FIG. 1.

In the embodiments of the disclosure, during measurement, the terminal device may measure and report only one measurement object classification every time and may also measure multiple measurement object classifications and report measurement results of the multiple measurement object classifications at one time.

Figure 2:
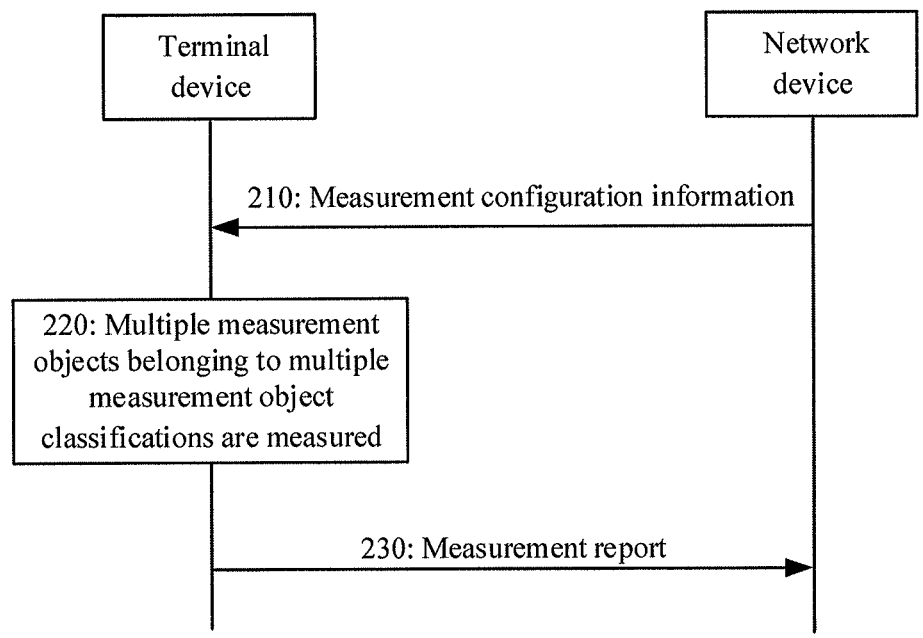
FIG. 2 is an interaction flowchart of a measurement method according to an embodiment of the disclosure.

FIG. 2 is an interaction flowchart of a measurement method according to an embodiment of the disclosure. FIG. 2 illustrates a network device and a terminal device. The network device may be, for example, the network device 10 shown in FIG. 1 and the terminal device may be, for example, the terminal device 20 shown in FIG. 1. As shown in FIG. 2, a specific measurement flow includes the following steps.

In 210, the network device sends measurement configuration information to the terminal device.

Herein, the measurement configuration information includes multiple measurement object classifications to be measured.

Optionally, the operation that the network device sends the measurement configuration information to the terminal device includes that: the network device sends the measurement configuration information to the terminal device through an RRC layer, a MAC layer or a physical layer.

In 220, the terminal device receives the measurement configuration information sent by the network device.

Specifically, the network device determines the measurement configuration information and sends the measurement configuration information to the terminal device in a manner of, for example, RRC-layer signaling, MAC-layer signaling and physical-layer signaling. The terminal device, after receiving the measurement configuration information, measures the multiple measurement object classifications to be measured indicated by the measurement configuration information and reports a measurement result meeting a condition to the network device.

Optionally, the multiple measurement object classifications include at least two of: a network device, a frequency point, a cell, a TRP and a beam.

For example, the measurement object classification is the frequency point. The measurement object classification configured for the terminal device by the network device is an independent frequency point and has an independent measurement object classification ID. For example, for co-frequency and inter-frequency measurement of a UMTS in an Evolved Universal Terrestrial Radio Access (E-UTRA) network, a measurement object classification is a single E-UTRA carrier frequency. For cells related to the carrier frequency, the network device may configure a cell offset list and a cell blacklist and executes no operation on cells in the cell blacklist during measurement evaluation and measurement reporting.

Optionally, the measurement configuration information may include, for example, at least one of the multiple measurement object classifications, a measurement classification (or called a measurement quantity) and respective reporting conditions of the multiple measurement object classifications. In addition, another parameter such as a measurement ID) a measurement gap, a measurement starting threshold value and a speed state parameter may further be included.

Optionally, the measurement classification may include, for example, at least one of: received power measurement, received signal quality measurement, received signal strength measurement or signal interference level measurement.

Optionally, the multiple measurement object classifications may include, for example, at least two of: the network device, the frequency point, the cell and the beam.

Herein, the network device includes, but not limited to, a base station, a TRP and the like.

In 230, the terminal device measures multiple measurement objects belonging to the multiple measurement object classifications according to the measurement configuration information.

Specifically, the terminal device measures these measurement object classifications according to the measurement object classifications in the measurement configuration information and evaluates and sends the measurement results to the network device or directly sends the measurement results to the network device.

Optionally, the measurement configuration information further includes multiple measurement conditions each corresponding to a measurement object classification, and the operation that the terminal device measures the multiple measurement objects each belonging to a measurement object classification according to the measurement configuration information includes that: the terminal device determines that each of the multiple measurement objects satisfies the measurement condition corresponding to the measurement object classification to which the measurement object belongs; and the terminal device measures the multiple measurement objects.

That is, the multiple measurement objects meet the measurement conditions corresponding to the measurement object classifications to which the multiple measurement objects belong respectively.

Specifically, the terminal device acquires the multiple measurement object classifications to be measured from the measurement configuration information and, meanwhile, may also acquire the measurement conditions corresponding to the multiple measurement object classifications respectively. When a measurement object belonging to a certain measurement object classification meets the measurement condition corresponding to the measurement object classification, the terminal device measures the measurement object belonging to the measurement object classification. The measurement condition includes, for example, the measurement starting threshold value, a measurement starting threshold range or the like.

For example, if the measurement object classifications include the cell, the terminal device receives service in a serving cell, and if signal quality of the serving cell is high, mobility measurement in any form may also not be required. When the signal quality of the serving cell is reduced to a certain degree and the measurement condition, for example, the measurement starting threshold value, is reached, the terminal device may autonomously start all co-frequency, inter-frequency and inter-technology measurement and the like according to the stored measurement ID. If the threshold value is not configured, the terminal device may keep performing mobility measurement without considering the signal quality of the serving cell.

Optionally, the terminal device may determine a present measurement object classification according to the measurement configuration information and a sequence of the multiple measurement object classifications and determine whether the measurement object belonging to the present measurement object classification meets the measurement condition corresponding to the present measurement object class. If the measurement object belonging to the present measurement object classification meets the measurement condition corresponding to the present measurement object classification, the terminal device measures the measurement object belonging to the present measurement object classification, determines the next measurement object classification according to the sequence and determines whether the measurement object belonging to the next measurement object classification meets the measurement condition corresponding to the next measurement object class. If the measurement object belonging to the present measurement object classification does not meet the measurement condition corresponding to the present measurement object classification, the terminal device stops measurement.

For example, if the multiple measurement object classifications include the frequency point and the cell, the terminal device may determine a frequency point meeting a measurement condition in multiple frequency points at first according to the sequence of the multiple measurement object classifications. For example, the measurement condition may be that the measurement object refers to a measurement object with a highest measurement result in multiple measurement objects of the measurement object classification and the measurement result may be received signal quality. Then, the terminal device measures the next measurement object classification according to the frequency point with the highest received signal quality in the multiple measurement frequency points and according to the sequence of the measurement object classifications. When a cell 1, a cell 2 and a cell 3 presently exist and the measurement condition corresponding to the next measurement object classification is that the received signal quality is higher than a preset threshold value, if measurement results of the cell 1 and the cell 2 both do not meet the measurement condition of being higher than the threshold value and a measurement result of the cell 3 is higher than the threshold value, the terminal device starts measuring the cell 3 at the frequency point.

The sequence of the multiple measurement object classifications may also not be considered for measurement over the multiple measurement object classifications. For example, a measurement result of measurement over a cell may usually be evaluated according to measurement results of multiple beams of the cell. There are no limits made herein.

In a measurement process, the terminal device may use the measurement gap. The measurement gap is configured to measure a cell to be measured at a certain gap when a receiver bandwidth of the terminal device is insufficient to simultaneously cover a frequency point of a serving cell and a frequency point of a cell to be measured. Inter-frequency-point measurement endows the terminal device with capabilities and, meanwhile, requires assistance of the measurement gap sometimes. Co-frequency measurement does not require the gap to be used because a center frequency point to be measured is a center frequency point of the serving cell.

In 240, the terminal device sends a measurement report to the network device.

Herein, the measurement report includes measurement results of measurement objects, each of which satisfies a reporting condition, of the multiple measurement objects.

Specifically, the terminal device, after measuring the multiple measurement objects each belonging to a measurement object classification, may determine according to a reporting condition corresponding to each measurement object classification in the multiple measurement object classifications whether to report the measurement result of the measurement object belonging to the measurement object classification to the network device. If the measurement result of the measurement object belonging to the measurement object classification meets the reporting condition corresponding to the measurement object classification, the terminal device sends the measurement result of the measurement object meeting the reporting condition to the network device. If the measurement result of the measurement object belonging to the measurement object classification does not meet the reporting condition of the measurement object classification, the terminal device does not send the measurement result of the measurement object to the network device. For example, the terminal device may fill the measurement report with the measurement result of the measurement object meeting the reporting condition in the multiple measurement objects each belonging to a measurement object classification and send the measurement report to the network device.

Herein, a content of the measurement report may include the measurement result of the measurement object meeting the reporting condition and may further include information of the measurement ID, the measurement classification and the like. The network device may learn the content of the frequency point, measurement condition and the like corresponding to present reporting from its own stored measurement configuration information through the ID.

If the measurement object classifications include the cell, the measurement report may further include a measured neighbor cell list and the neighbor cell list includes a physical cell ID, a measurement result corresponding to the cell, a cell ID, a tracking area code and a PLMN list. After the measurement report is filled, the terminal device may, for example, submit the measurement report to a bottom layer through the RRC layer for transmission to the network device.

Optionally, the measurement configuration information further includes multiple reporting conditions each corresponding to a measurement object classification, and before the operation that the terminal device sends the measurement report to the network device, the method further includes that: the terminal device generates the measurement report according to measurement results of the multiple measurement objects and the multiple reporting conditions each corresponding to a measurement object classification.

Specifically, the terminal device may determine whether the measurement result of each measurement object meets the reporting condition corresponding to the measurement object classification it belongs to according to the measurement results, obtained by measurement, of the multiple measurement objects and in combination with the multiple reporting conditions each corresponding to a measurement object classification, if the corresponding reporting condition is met, writes the measurement result of the measurement object into the measurement report, otherwise does not write it into the measurement report.

Optionally, the reporting condition corresponding to the present measurement object classification includes at least one of: the measurement result of the measurement object of the present measurement object classification is higher than a first preset threshold, or the measurement result of the measurement object of the present measurement object classification is kept higher than the first preset threshold for a first preset duration; the measurement result of the measurement object of the present measurement object classification is lower than a second preset threshold, or the measurement result of the measurement object of the present measurement object classification is kept lower than the second preset threshold for a second preset duration; the measurement result of the measurement result of the present measurement object classification is within a preset range, or the measurement result of the measurement object of the present measurement object classification is kept within the preset range for a third preset duration; n measurement objects, that have highest measurement results, of multiple measurement objects of the present measurement object classification each is taken as the measurement object of the present measurement object classification, or n measurement objects, that have highest measurement results for a fourth preset duration, of multiple measurement objects of the present measurement object classification each is taken as the measurement object of the present measurement object classification, n being a positive integer; m measurement objects, that have lowest measurement results, of multiple measurement objects of the present measurement object classification each is taken as the measurement object of the present measurement object classification, or m measurement objects, that have lowest measurement results for a fifth preset duration, of multiple measurement objects of the present measurement object classification each is taken as the measurement object of the present measurement object classification; and a sending moment of the measurement report meets a preset reporting period.

Optionally, the reporting condition corresponding to the next measurement object classification includes at least one of: the terminal device is able to obtain a measurement result of a measurement object of a next measurement object classification by measurement; the measurement result of the measurement object of the next measurement object classification is higher than the first preset threshold, or the measurement result of the measurement object of the next measurement object classification is kept higher than the first preset threshold for the first preset duration; the measurement result of the measurement object of the next measurement object classification is lower than the second preset threshold, or the measurement result of the measurement object of the next measurement object classification is kept lower than the second preset threshold for the second preset duration; the measurement result of the measurement result of the next measurement object classification is within the preset range, or the measurement result of the measurement object of the next measurement object classification is kept within the preset range for the third preset duration; n measurement objects, that have highest measurement results, of multiple measurement objects of the next measurement object classification each is taken as the measurement object of the next measurement object classification, or n measurement objects, that have highest measurement results for a fourth preset duration, of multiple measurement objects of the next measurement object classification each is taken as the measurement object of the next measurement object classification; and m measurement objects, that have lowest measurement results, of multiple measurement objects of the next measurement object classification each is taken as the measurement object of the next measurement object classification, or m measurement objects, that have lowest measurement results for a fifth preset duration, of multiple measurement objects of the next measurement object classification each is taken as the measurement object of the next measurement object classification.

Herein, the reporting condition may be divided into, for example, three types of event-triggered reporting, periodically-triggered reporting and event-triggered periodic reporting. The reporting condition indicating event-triggered reporting may include the measurement classification and the threshold value. The reporting condition indicating periodically-triggered reporting may include a reporting period and a periodic triggering purpose. The reporting condition indicating event-triggered periodic reporting may include the measurement classification, the threshold value and a duration when the threshold value is kept met. If the measurement object classification is the cell, the reporting condition corresponding to the measurement object classification may include, for example, five classifications as follows. (1) A reporting condition A1: channel quality of a serving cell is higher than a threshold value, or the channel quality of the serving cell is kept higher than the threshold value for a preset duration. (2) A reporting condition A2: the channel quality of the serving cell is lower than the threshold value, or the channel quality of the serving cell is kept lower than the threshold value for the preset duration. (3) A reporting condition A3: channel quality and offset of a neighbor cell are higher than the channel quality of the serving cell, or the channel quality and offset of the neighbor cell are kept higher than the channel quality of the serving cell for the preset duration. (4) A reporting condition A4: the channel quality of the neighbor cell is higher than the threshold value, or the channel quality of the neighbor cell is kept higher than the threshold value for the preset duration. (5) A reporting condition A5: the channel quality of the serving cell is lower than a first threshold value and, meanwhile, the channel quality of the neighbor cell is higher than a second threshold value, or the channel quality of the serving cell is kept lower than the first threshold value for the preset duration and, meanwhile, the channel quality of the neighbor cell is kept higher than the second threshold value for the preset duration.

If the reporting condition is event-triggered reporting, the reporting condition may include any reporting condition in A1~A5, a reporting frequency corresponding to the reporting condition is 1 and the terminal device may neglect a reporting gap corresponding to the reporting condition regardless of a value thereof.

If the reporting condition is periodic reporting, the reporting condition may include a reporting period and a reporting purpose. The reporting purpose includes report Cell Global Identifier (CGI) and report strongest cell. The terminal device may fill the measurement report according to the measurement configuration information and send the measurement report to the network device according to the specified reporting period. If the reporting purpose is report CGI, the reporting frequency corresponding to the reporting condition is 1. If the reporting purpose is report strongest cell, the reporting frequency corresponding to the reporting condition may be higher than 1. For example, if reporting for the purpose of report CGI is configured for the terminal device, the terminal device may start a timer to determine reporting time. For enabling the network device to obtain information required by creation of a neighbor cell list as soon as possible, if a content required by reporting has been obtained before a timeout of the timer, the terminal device may stop the timer and initiate reporting ahead of schedule.

If the reporting condition is event-triggered periodic reporting, the reporting condition may include any reporting condition in A1~A5, the reporting frequency corresponding to the reporting condition is equal to a target value, the reporting gap corresponding to the reporting condition is valid, and the network device sets the timer according to a configured gap parameter. When the measurement result meets the reporting condition configured by a network, that is, the measurement result keeps reaching the preset threshold value for a period time, evaluation of the subsequent measurement objects to be measured may be triggered. If the measurement results of all the subsequent measurement objects to be measured meet the respective reporting conditions, the terminal device sends the measurement results of the multiple measurement objects to the network device. In such case, the timer may be started to measure the multiple measurement objects for many times in the abovementioned manner, a counter for a measurement frequency is started, and when the reporting frequency of the terminal device reaches the target value, the flow is ended. The corresponding reporting manner is as follows: the type of the reporting condition may be any one of A1~A5; the reporting frequency is higher than 1; and the reporting gap is valid, and the network device sets the reporting period timer according to the configured gap parameter.

If the multiple measurement object classifications include the cell, under the condition that the reporting condition is event-triggered reporting, the terminal device may store a cell list variable to be reported. During subsequent measurement, if a cell in the list does not meet a keeping condition, the cell is deleted from the list, and if a new cell meets the condition, the cell may be added into the list.

Optionally, the operation that the terminal device generates the measurement report according to the measurement results of the multiple measurement objects and the multiple reporting conditions each corresponding to a measurement object classification includes that: the terminal device determines a present measurement object classification to be written into the measurement report according to the measurement results of the multiple measurement objects and a sequence of the multiple measurement object classifications; whether the measurement result of the measurement object belonging to the present measurement object classification meets the reporting condition corresponding to the present measurement object classification is determined; if the measurement result of the measurement object of the present measurement object classification meets the reporting condition corresponding to the present measurement object classification, the terminal device writes the measurement result of the measurement object of the present measurement object classification into the measurement report, determines the next measurement object classification according to the sequence and determines whether the measurement result of the measurement object belonging to the next measurement object classification meets the reporting condition corresponding to the next measurement object class; and if the measurement result of the measurement object of the present measurement object classification does not meet the reporting condition corresponding to the present measurement object classification, the terminal device stops filling the measurement report.

In the embodiment, the terminal device, when reporting the measurement results of the multiple measurement objects each belonging to a measurement object classification, may evaluate the measurement results of the multiple measurement object classifications according to the sequence (or understood as an evaluation sequence) of the multiple measurement object classifications, determine the measurement result, to be written into the measurement report, of the measurement result in the multiple measurement objects and, after completing filling the measurement report, sends the measurement report to the network device.

Any two measurement object classifications in the multiple measurement object classifications are taken as an example. The terminal device evaluates the multiple measurement object classifications according to the sequence of the multiple measurement object classifications. At first, whether to report the measurement object belonging to a first measurement object class is determined. If the measurement result of the measurement object belonging to the first measurement object classification meets the measurement condition corresponding to the first measurement object classification, the terminal device writes the measurement result of the measurement object belonging to the first measurement object classification into the measurement report and judges (or evaluates) whether the measurement object belonging to a second measurement object classification meets the reporting condition corresponding to the second measurement object class. If the measurement object belonging to the second measurement object classification meets the reporting condition corresponding to the second measurement object classification, the terminal device writes the measurement result of the measurement object belonging to the second measurement object classification into the measurement report.

If the terminal device, after evaluating the measurement object belonging to the first measurement object classification, determines that the measurement result of the measurement object of the first measurement object classification does not meet the reporting condition corresponding to the first measurement object classification, the terminal device may not write the measurement result of the measurement object of the first measurement object classification into the measurement report and may not continue evaluating the measurement object of the second measurement object classification.

That is, no matter whether the measurement result of the measurement object belonging to the second measurement object classification meets the reporting condition corresponding to the second measurement object class, the terminal device may not evaluate the measurement object of the second measurement object classification as long as the measurement result of the measurement object belonging to the first measurement object classification does not meet the reporting condition corresponding to the first measurement object classification.

The terminal device sequentially evaluates the multiple measurement objects each belonging to a measurement object classification in the abovementioned manner according to the sequence of the multiple measurement object classifications until the measurement results of the measurement objects meeting the conditions are all written into the measurement report and then sends the measurement report to the network device.

Any two measurement object classifications in the multiple measurement objects are taken as an example. There is made such a hypothesis that the multiple measurement object classifications include a measurement object classification A and a measurement object classification B and the measurement object classification A is before the measurement object classification B. Then, when a measurement result, obtained by measurement, of the measurement object classification A meets a requirement of a preset threshold A and a measurement result, obtained by measurement, of the measurement object classification B meets a requirement of a preset threshold B, the terminal device reports the measurement results of the measurement object classification A and the measurement object classification B to the network device. Or, when the measurement result of the measurement object classification A keeps meeting the requirement of the preset threshold A for a certain time T1 and the measurement result of the measurement object classification B meets the requirement of the preset threshold B, the terminal device reports the measurement results of the measurement object classification A and the measurement object classification B to the network device. When a measurement result, obtained by measurement, of a certain object A meets a preconfigured condition A and a measurement result, obtained by measurement, of another object B keeps meeting a preconfigured condition B for a certain time T2, the terminal reports the measurement results of A and B to the network device. Or, when the measurement result of the measurement object classification A keeps meeting the requirement of the preset threshold A for a certain time T1 and the measurement result of the measurement object classification B keeps meeting the requirement of the preset threshold B for a certain time T2, the terminal device reports the measurement results of the measurement object classification A and the measurement object classification B to the network device.

In 250, the network device receives measurement results of the multiple measurement objects from the terminal device.

Specifically, the terminal device, after completing measuring the multiple measurement objects, sends the measurement results of the multiple measurement objects to the network device. The network device, after receiving the measurement results of the multiple measurement objects, may manage and schedule a transmission resource according to the measurement results of the multiple measurement objects. For example, the measurement results of the multiple measurement objects may be configured for the network device to perform handover or perfect a neighbor cell relationship list.

The measurement method of the embodiment of the disclosure for the terminal will specifically be described below with two detailed examples.

There is made such a hypothesis that the terminal device, after receiving the measurement configuration information sent by the network device, acquires that its measurement objects are the cell and the beam. According to the sequence of the measurement object classifications, if the cell is at a previous position of the beam, the first measurement object classification is the cell and the second measurement object classification is the beam. The terminal device may also acquire from the measurement configuration information that measurement classifications for measurement of the cell and the beam are received power measurement, the reporting condition for cell measurement is that the measurement result is higher than the preset threshold value A and the reporting condition for beam cell is that the measurement result is kept within a preset range [B, C] for the preset duration T1.

The terminal device evaluates the measurement results of cell measurement at first. If the cell 1, the cell 2 and the cell 3 are presently measured, the measurement results of the cell 1 and the cell 2 are both lower than the preset threshold value A and the measurement result of the cell 3 is higher than the preset threshold value A, the terminal device writes the received signal power of the cell 3 into the measurement report and then measures a beam of the cell 3. After multiple beams of the cell 3 are measured, if the beam of which the received signal power is kept within the preset range [B, C] for the preset duration T1 is obtained, the terminal device writes a measurement result of the beam of which the received power is kept within the preset range [B, C] for the preset duration T1 in the multiple beams into the measurement report and sends the measurement report to the network device.

For another example, there is made such a hypothesis that the measurement objects of the terminal device are the cell, the beam and the network device. According to the sequence of the measurement object classifications, there is made such a hypothesis that the cell is at the first position, the beam and the network device are at the second position, a measurement classification for measurement of the cell, the beam and the network device is signal interference level measurement, a reporting condition for cell measurement is that the measurement result is kept lower than a preset threshold D for the preset duration T2, a reporting condition for beam measurement is that the measurement result is lower than a preset threshold E and a reporting condition for network device measurement is that the measurement result is lower than a preset threshold F.

According to the sequence, the terminal device performs cell measurement at first. If the cell 1, the cell 2 and the cell 3 are presently measured, the measurement results of the cell 1 and the cell 2 are both lower than the preset threshold value A and the measurement result of the cell 3 is higher than the preset threshold value A, the terminal device writes the received signal power of the cell into the measurement report and then evaluates a beam and network device of the cell 3. Herein, the network device may include a base station or a TRP. The terminal device measures a TRP 1 and TRP 2 in the cell 3. If a measurement result of the TRP 1 is lower than the preset threshold F and a measurement result of the TRP 2 is higher than the preset threshold F, the terminal device writes the measurement result of the TRP 1 into the measurement report. If the terminal device, after measuring multiple beams of the cell 3, obtains the beam of which a measurement result is lower than the preset threshold E, the terminal device writes the measurement result of the beam of which the measurement result is lower than the preset threshold E in the multiple beams into the measurement report. Then, the terminal device sends the measurement report to the network device, the measurement report including the measurement result of the cell, the measurement result of the beam meeting the condition and the measurement result of the TRP 1.

In the embodiment of the disclosure, the terminal device reports the measurement results of the multiple evaluated measurement object classifications to the network device, thereby providing rich auxiliary information for the network device and meeting a high-performance radio resource management requirement.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Figure 3:
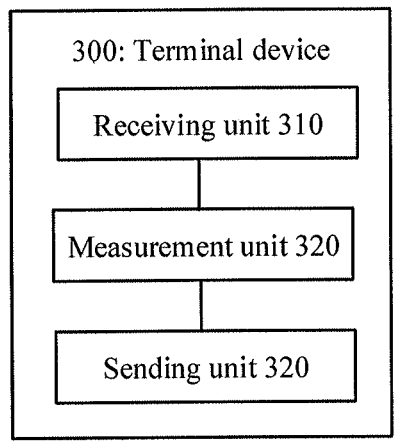
FIG. 3 is a structure block diagram of a terminal device according to an embodiment of the disclosure.

FIG. 3 is a schematic block diagram of a terminal device 300 according to an embodiment of the disclosure. As shown in FIG. 3, the terminal device 300 includes a receiving unit 310, a measurement unit 320 and a sending unit 330.

The receiving unit 310 is configured to receive measurement configuration information sent by a network device, the measurement configuration information including multiple measurement object classifications to be measured.

The measurement unit 320 is configured to measure multiple measurement objects belonging to the multiple measurement object classifications according to the measurement configuration information.

The sending unit 330 is configured to send a measurement report to the network device, the measurement report including measurement results of measurement objects, each of which satisfies a reporting condition, of the multiple measurement objects.

In the embodiment of the disclosure, the terminal device reports measurement results of the multiple evaluated measurement object classifications to the network device, thereby providing rich auxiliary information for the network device and meeting a high-performance radio resource management requirement.

Optionally, the measurement configuration information further includes multiple measurement conditions each corresponding to a measurement object classification, and the operation that the terminal device measures the multiple measurement objects each belonging to a measurement object classification according to the measurement configuration information includes that: the terminal device determines that each of the multiple measurement objects satisfies the measurement condition corresponding to the measurement object classification to which the measurement object belongs; and the terminal device measures the multiple measurement objects.

Optionally, the measurement configuration information further includes multiple reporting conditions each corresponding to a measurement object classification, and the measurement unit 320 is further configured to:

before the sending unit 330 sends the measurement report to the network device, generate the measurement report according to measurement results of the multiple measurement objects and the multiple reporting conditions each corresponding to a measurement object classification.

Optionally, the measurement unit 320 is specifically configured to: determine a present measurement object classification to be written into the measurement report according to the measurement results of the multiple measurement objects and a sequence of the multiple measurement object classifications; determine whether the measurement result of the measurement object belonging to the present measurement object classification meets the reporting condition corresponding to the present measurement object classification; if the measurement result of the measurement object of the present measurement object classification meets the reporting condition corresponding to the present measurement object classification, by the terminal device, write the measurement result of the measurement object of the present measurement object classification into the measurement report, determine the next measurement object classification according to the sequence and determine whether the measurement result of the measurement object belonging to the next measurement object classification meets the reporting condition corresponding to the next measurement object class; and if the measurement result of the measurement object of the present measurement object classification does not meet the reporting condition corresponding to the present measurement object classification, stop filling, by the terminal device, the measurement report.

Optionally, the reporting condition corresponding to the present measurement object classification includes at least one of: the measurement result of the measurement object of the present measurement object classification is higher than a first preset threshold, or the measurement result of the measurement object of the present measurement object classification is kept higher than the first preset threshold for a first preset duration; the measurement result of the measurement object of the present measurement object classification is lower than a second preset threshold, or the measurement result of the measurement object of the present measurement object classification is kept lower than the second preset threshold for a second preset duration; the measurement result of the measurement result of the present measurement object classification is within a preset range, or the measurement result of the measurement object of the present measurement object classification is kept within the preset range for a third preset duration; n measurement objects, that have highest measurement results, of multiple measurement objects of the present measurement object classification each is taken as the measurement object of the present measurement object classification, or n measurement objects, that have highest measurement results for a fourth preset duration, of multiple measurement objects of the present measurement object classification each is taken as the measurement object of the present measurement object classification, n being a positive integer; m measurement objects, that have lowest measurement results, of multiple measurement objects of the present measurement object classification each is taken as the measurement object of the present measurement object classification, or m measurement objects, that have lowest measurement results for a fifth preset duration, of multiple measurement objects of the present measurement object classification each is taken as the measurement object of the present measurement object classification; and a sending moment of the measurement report meets a preset reporting period.

Optionally, the reporting condition corresponding to the next measurement object classification includes at least one of: the terminal device is able to obtain a measurement result of a measurement object of a next measurement object classification by measurement; the measurement result of the measurement object of the next measurement object classification is higher than the first preset threshold, or the measurement result of the measurement object of the next measurement object classification is kept higher than the first preset threshold for the first preset duration; the measurement result of the measurement object of the next measurement object classification is lower than the second preset threshold, or the measurement result of the measurement object of the next measurement object classification is kept lower than the second preset threshold for the second preset duration; the measurement result of the measurement result of the next measurement object classification is within the preset range, or the measurement result of the measurement object of the next measurement object classification is kept within the preset range for the third preset duration; n measurement objects, that have highest measurement results, of multiple measurement objects of the next measurement object classification each is taken as the measurement object of the next measurement object classification, or n measurement objects, that have highest measurement results for a fourth preset duration, of multiple measurement objects of the next measurement object classification each is taken as the measurement object of the next measurement object classification; and m measurement objects, that have lowest measurement results, of multiple measurement objects of the next measurement object classification each is taken as the measurement object of the next measurement object classification, or m measurement objects, that have lowest measurement results for a fifth preset duration, of multiple measurement objects of the next measurement object classification each is taken as the measurement object of the next measurement object classification.

Optionally, the multiple measurement object classifications include at least two of: a network device, a frequency point, a cell or a beam.

Optionally, measurement includes at least one of: received signal power measurement, received signal quality measurement, received signal strength measurement or signal interference level measurement.

Optionally, the receiving unit 310 is specifically be configured to receive the measurement configuration information sent by the network device through an RRC layer, a MAC layer or a physical layer.

Figure 4:
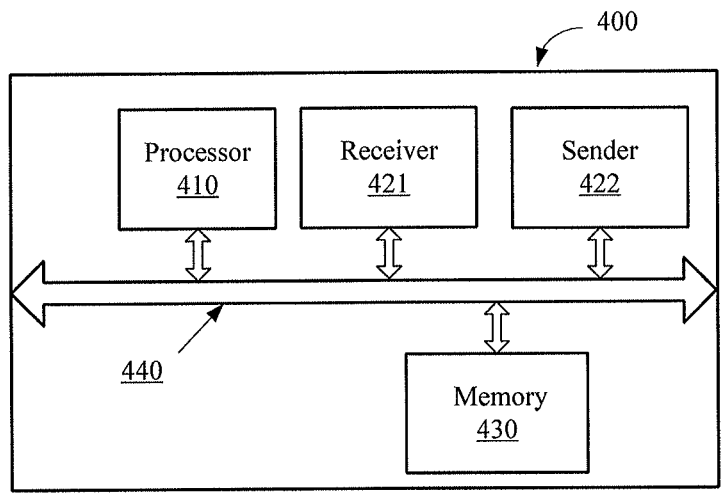
FIG. 4 is a structure block diagram of a terminal device according to an embodiment of the disclosure.

It is to be noted that, in the embodiment of the disclosure, the receiving module 310 may be implemented by a receiver, the sending unit 330 may be implemented by a sender and the measurement unit 320 may be implemented by a processor. As shown in FIG. 4, a terminal device 400 may include a processor 410, a transceiver 420 and a memory 430. The transceiver 420 may include a receiver 421 and a sender 422. The memory 430 may be configured to store related information of multiple measurement classifications and the like, and may further be configured to store a code executed by the processor 410 and the like. Each component in the terminal device 400 is coupled together through a bus system 440. The bus system 440 includes a data bus, and further includes a power bus, a control bus, a state signal bus and the like.

Herein, the receiver 421 is configured to receive measurement configuration information sent by a network device, the measurement configuration information including multiple measurement object classifications to be measured. The processor 410 is configured to measure multiple measurement objects belonging to the multiple measurement object classifications according to the measurement configuration information. The sender 422 is configured to send a measurement report to the network device, the measurement report including measurement results of measurement objects, each of which satisfies a reporting condition, of the multiple measurement objects.

Optionally, the measurement configuration information further includes multiple measurement conditions each corresponding to a measurement object classification, and the operation that the terminal device measures the multiple measurement objects each belonging to a measurement object classification according to the measurement configuration information includes that: the terminal device determines that each of the multiple measurement objects satisfies the measurement condition corresponding to the measurement object classification to which the measurement object belongs; and the terminal device measures the multiple measurement objects.

Optionally, the measurement configuration information further includes multiple reporting conditions each corresponding to a measurement object classification, and the processor 410 is further configured to, before the sender 422 sends the measurement report to the network device, generate the measurement report according to measurement results of the multiple measurement objects and the multiple reporting conditions each corresponding to a measurement object classification.

Optionally, the processor 410 is specifically configured to: determine a present measurement object classification to be written into the measurement report according to the measurement results of the multiple measurement objects and a sequence of the multiple measurement object classifications; determine whether the measurement result of the measurement object belonging to the present measurement object classification meets the reporting condition corresponding to the present measurement object classification; if the measurement result of the measurement object of the present measurement object classification meets the reporting condition corresponding to the present measurement object classification, by the terminal device, write the measurement result of the measurement object of the present measurement object classification into the measurement report, determine the next measurement object classification according to the sequence and determine whether the measurement result of the measurement object belonging to the next measurement object classification meets the reporting condition corresponding to the next measurement object class; and if the measurement result of the measurement object of the present measurement object classification does not meet the reporting condition corresponding to the present measurement object classification, stop filling, by the terminal device, the measurement report.

Optionally, the reporting condition corresponding to the present measurement object classification includes at least one of: the measurement result of the measurement object of the present measurement object classification is higher than a first preset threshold, or the measurement result of the measurement object of the present measurement object classification is kept higher than the first preset threshold for a first preset duration; the measurement result of the measurement object of the present measurement object classification is lower than a second preset threshold, or the measurement result of the measurement object of the present measurement object classification is kept lower than the second preset threshold for a second preset duration; the measurement result of the measurement result of the present measurement object classification is within a preset range, or the measurement result of the measurement object of the present measurement object classification is kept within the preset range for a third preset duration; n measurement objects, that have highest measurement results, of multiple measurement objects of the present measurement object classification each is taken as the measurement object of the present measurement object classification, or n measurement objects, that have highest measurement results for a fourth preset duration, of multiple measurement objects of the present measurement object classification each is taken as the measurement object of the present measurement object classification, n being a positive integer; m measurement objects, that have lowest measurement results, of multiple measurement objects of the present measurement object classification each is taken as the measurement object of the present measurement object classification, or m measurement objects, that have lowest measurement results for a fifth preset duration, of multiple measurement objects of the present measurement object classification each is taken as the measurement object of the present measurement object classification; and a sending moment of the measurement report meets a preset reporting period.

Optionally, the reporting condition corresponding to the next measurement object classification includes at least one of: the terminal device is able to obtain a measurement result of a measurement object of a next measurement object classification by measurement; the measurement result of the measurement object of the next measurement object classification is higher than the first preset threshold, or the measurement result of the measurement object of the next measurement object classification is kept higher than the first preset threshold for the first preset duration; the measurement result of the measurement object of the next measurement object classification is lower than the second preset threshold, or the measurement result of the measurement object of the next measurement object classification is kept lower than the second preset threshold for the second preset duration; the measurement result of the measurement result of the next measurement object classification is within the preset range, or the measurement result of the measurement object of the next measurement object classification is kept within the preset range for the third preset duration; n measurement objects, that have highest measurement results, of multiple measurement objects of the next measurement object classification each is taken as the measurement object of the next measurement object classification, or n measurement objects, that have highest measurement results for a fourth preset duration, of multiple measurement objects of the next measurement object classification each is taken as the measurement object of the next measurement object classification; and m measurement objects, that have lowest measurement results, of multiple measurement objects of the next measurement object classification each is taken as the measurement object of the next measurement object classification, or m measurement objects, that have lowest measurement results for a fifth preset duration, of multiple measurement objects of the next measurement object classification each is taken as the measurement object of the next measurement object classification.

Optionally, the multiple measurement object classifications include at least two of: a network device, a frequency point, a cell or a beam.

Optionally, measurement includes at least one of: received signal power measurement, received signal quality measurement, received signal strength measurement or signal interference level measurement.

Optionally, the receiver 421 is specifically be configured to receive the measurement configuration information sent by the network device through an RRC layer, a MAC layer or a physical layer.

Figure 5:
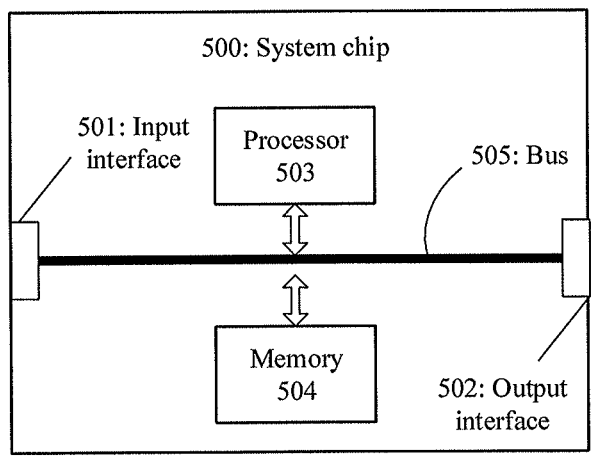
FIG. 5 is a schematic structure diagram of a system chip according to an embodiment of the disclosure.

FIG. 5 is a schematic structure diagram of a system chip according to an embodiment of the disclosure. The system chip 500 of FIG. 5 includes an input interface 501, an output interface 502, at least one processor 503 and a memory 504. The input interface 501, the output interface 502, the processor 503 and the memory 504 are connected through a bus 505. The processor 503 is configured to execute a code in the memory 504. When the code is executed, the processor 503 may implement the method executed by the terminal device in FIG. 2. The bus 505 is only an example of a connection manner. In the embodiment of the disclosure, the input interface 501, the output interface 502, the processor 503 and the memory 504 may also be connected in another manner. There are no limits made herein.

Figure 6:
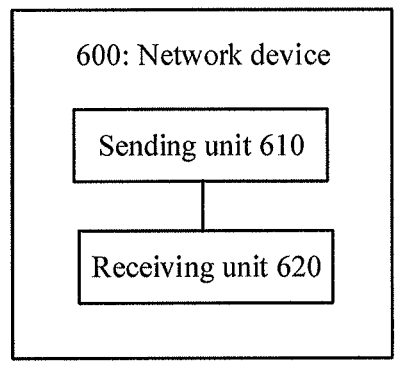
FIG. 6 is a structure block diagram of a network device according to an embodiment of the disclosure.

FIG. 6 is a schematic block diagram of a network device 600 according to an embodiment of the disclosure. As shown in FIG. 6, the network device 600 includes a sending unit 610 and a receiving unit 620.

The sending unit 610 is configured to send measurement configuration information to a terminal device, the measurement configuration information including multiple measurement object classifications to be measured, to enable the terminal device to measure multiple measurement objects belonging to the multiple measurement object classifications according to the measurement configuration information.

The receiving unit 620 is configured to receive a measurement report sent by the terminal device, the measurement report including measurement results of measurement objects, each of which satisfies a reporting condition, of the multiple measurement objects.

In the embodiment of the disclosure, the network device receives measurement results of evaluated measurement object of multiple classifications from the terminal device, thereby obtaining rich auxiliary information and meeting a high-performance radio resource management requirement.

Optionally, each of the multiple measurement objects satisfies the measurement condition corresponding to the measurement object classification to which the measurement object belongs.

Optionally, the measurement configuration information further includes multiple reporting conditions each corresponding to a measurement object classification to enable the terminal device to, before sending the measurement report to the network device, generate the measurement report according to measurement results of the multiple measurement objects and the multiple reporting conditions each corresponding to a measurement object classification.

Optionally, the multiple measurement object classifications meet a preset sequence, and the sequence is configured for the terminal device to determine a present measurement object classification to be written into the measurement report according to the measurement results of the multiple measurement objects and the sequence of the multiple measurement object classifications and determine whether the measurement result of the measurement object belonging to the present measurement object classification meets the reporting condition corresponding to the present measurement object classification; if the measurement result of the measurement object of the present measurement object classification meets the reporting condition corresponding to the present measurement object classification, the measurement report includes the measurement result of the measurement object of the present measurement object classification, and the sequence is further configured for the terminal device to determine whether the measurement result of the measurement object of the next measurement object classification meets the reporting condition corresponding to the next measurement object class; and if the measurement result of the measurement object of the present measurement object classification does not meet the reporting condition corresponding to the present measurement object classification, the measurement report does not include the measurement result of the measurement object of the present measurement object classification, and the sequence is further configured for the terminal device to stop filling the measurement report.

Optionally, the reporting condition corresponding to the present measurement object classification includes at least one of: the measurement result of the measurement object of the present measurement object classification is higher than a first preset threshold, or the measurement result of the measurement object of the present measurement object classification is kept higher than the first preset threshold for a first preset duration; the measurement result of the measurement object of the present measurement object classification is lower than a second preset threshold, or the measurement result of the measurement object of the present measurement object classification is kept lower than the second preset threshold for a second preset duration; the measurement result of the measurement result of the present measurement object classification is within a preset range, or the measurement result of the measurement object of the present measurement object classification is kept within the preset range for a third preset duration; n measurement objects, that have highest measurement results, of multiple measurement objects of the present measurement object classification each is taken as the measurement object of the present measurement object classification, or n measurement objects, that have highest measurement results for a fourth preset duration, of multiple measurement objects of the present measurement object classification each is taken as the measurement object of the present measurement object classification, n being a positive integer; m measurement objects, that have lowest measurement results, of multiple measurement objects of the present measurement object classification each is taken as the measurement object of the present measurement object classification, or m measurement objects, that have lowest measurement results for a fifth preset duration, of multiple measurement objects of the present measurement object classification each is taken as the measurement object of the present measurement object classification; and a sending moment of the measurement report meets a preset reporting period.

Optionally, the reporting condition corresponding to the next measurement object classification includes at least one of: the terminal device is able to obtain a measurement result of a measurement object of a next measurement object classification by measurement; the measurement result of the measurement object of the next measurement object classification is higher than the first preset threshold, or the measurement result of the measurement object of the next measurement object classification is kept higher than the first preset threshold for the first preset duration; the measurement result of the measurement object of the next measurement object classification is lower than the second preset threshold, or the measurement result of the measurement object of the next measurement object classification is kept lower than the second preset threshold for the second preset duration; the measurement result of the measurement result of the next measurement object classification is within the preset range, or the measurement result of the measurement object of the next measurement object classification is kept within the preset range for the third preset duration; n measurement objects, that have highest measurement results, of multiple measurement objects of the next measurement object classification each is taken as the measurement object of the next measurement object classification, or n measurement objects, that have highest measurement results for a fourth preset duration, of multiple measurement objects of the next measurement object classification each is taken as the measurement object of the next measurement object classification; and m measurement objects, that have lowest measurement results, of multiple measurement objects of the next measurement object classification each is taken as the measurement object of the next measurement object classification, or m measurement objects, that have lowest measurement results for a fifth preset duration, of multiple measurement objects of the next measurement object classification each is taken as the measurement object of the next measurement object classification.

Optionally, the multiple measurement object classifications include at least two of: a network device, a frequency point, a cell or a beam.

Optionally, measurement includes at least one of: received power measurement, received signal quality measurement, received signal strength measurement or signal interference level measurement.

Optionally, the sending unit 610 is specifically be configured to send the measurement configuration information to the terminal device through an RRC layer, a MAC layer or a physical layer.

Figure 7:
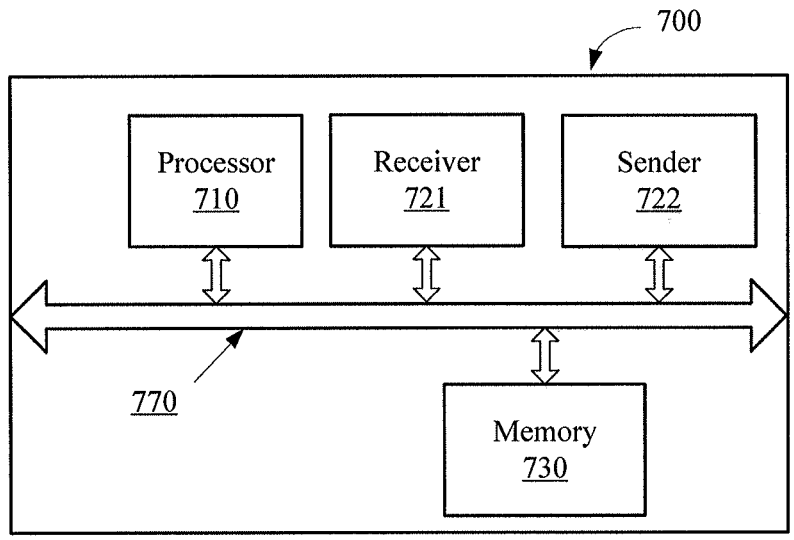
FIG. 7 is a structure block diagram of a network device according to an embodiment of the disclosure.

It is to be noted that, in the embodiment of the disclosure, the receiving unit 630 may be implemented by a receiver, the sending unit 620 may be implemented by a sender and a determination unit may be implemented by a processor. As shown in FIG. 7, a network device 700 may include a processor 710, a transceiver 720 and a memory 730. The transceiver 720 may include a receiver 721 and a sender 722. The memory 730 may be configured to store parameter information, transmission information and related information of a multiple access manner and the like, and may further be configured to store a code executed by the processor 710 and the like. Each component in the network device 700 is coupled together through a bus system 740. The bus system 740 includes a data bus, and further includes a power bus, a control bus, a state signal bus and the like.

The sender 722 is configured to send measurement configuration information to a terminal device, the measurement configuration information including multiple measurement object classifications to be measured, to enable the terminal device to measure multiple measurement objects belonging to the multiple measurement object classifications according to the measurement configuration information.

The receiver 721 is configured to receive a measurement report sent by the terminal device, the measurement report including measurement results of measurement objects, each of which satisfies a reporting condition, of the multiple measurement objects.

Optionally, each of the multiple measurement objects satisfies the measurement condition corresponding to the measurement object classification to which the measurement object belongs.

Optionally, the measurement configuration information further includes multiple reporting conditions each corresponding to a measurement object classification to enable the terminal device to, before sending the measurement report to the network device, generate the measurement report according to measurement results of the multiple measurement objects and the multiple reporting conditions each corresponding to a measurement object classification.

Optionally, the multiple measurement object classifications meet a preset sequence, and the sequence is configured for the terminal device to determine a present measurement object classification to be written into the measurement report according to the measurement results of the multiple measurement objects and the sequence of the multiple measurement object classifications and determine whether the measurement result of the measurement object belonging to the present measurement object classification meets the reporting condition corresponding to the present measurement object classification; if the measurement result of the measurement object of the present measurement object classification meets the reporting condition corresponding to the present measurement object classification, the measurement report includes the measurement result of the measurement object of the present measurement object classification, and the sequence is further configured for the terminal device to determine whether the measurement result of the measurement object of the next measurement object classification meets the reporting condition corresponding to the next measurement object class; and if the measurement result of the measurement object of the present measurement object classification does not meet the reporting condition corresponding to the present measurement object classification, the measurement report does not include the measurement result of the measurement object of the present measurement object classification, and the sequence is further configured for the terminal device to stop filling the measurement report.

Optionally, the reporting condition corresponding to the present measurement object classification includes at least one of: the measurement result of the measurement object of the present measurement object classification is higher than a first preset threshold, or the measurement result of the measurement object of the present measurement object classification is kept higher than the first preset threshold for a first preset duration; the measurement result of the measurement object of the present measurement object classification is lower than a second preset threshold, or the measurement result of the measurement object of the present measurement object classification is kept lower than the second preset threshold for a second preset duration; the measurement result of the measurement result of the present measurement object classification is within a preset range, or the measurement result of the measurement object of the present measurement object classification is kept within the preset range for a third preset duration; n measurement objects, that have highest measurement results, of multiple measurement objects of the present measurement object classification each is taken as the measurement object of the present measurement object classification, or n measurement objects, that have highest measurement results for a fourth preset duration, of multiple measurement objects of the present measurement object classification each is taken as the measurement object of the present measurement object classification, n being a positive integer; m measurement objects, that have lowest measurement results, of multiple measurement objects of the present measurement object classification each is taken as the measurement object of the present measurement object classification, or m measurement objects, that have lowest measurement results for a fifth preset duration, of multiple measurement objects of the present measurement object classification each is taken as the measurement object of the present measurement object classification; and a sending moment of the measurement report meets a preset reporting period.

Optionally, the reporting condition corresponding to the next measurement object classification includes at least one of: the terminal device is able to obtain a measurement result of a measurement object of a next measurement object classification by measurement; the measurement result of the measurement object of the next measurement object classification is higher than the first preset threshold, or the measurement result of the measurement object of the next measurement object classification is kept higher than the first preset threshold for the first preset duration; the measurement result of the measurement object of the next measurement object classification is lower than the second preset threshold, or the measurement result of the measurement object of the next measurement object classification is kept lower than the second preset threshold for the second preset duration; the measurement result of the measurement result of the next measurement object classification is within the preset range, or the measurement result of the measurement object of the next measurement object classification is kept within the preset range for the third preset duration; n measurement objects, that have highest measurement results, of multiple measurement objects of the next measurement object classification each is taken as the measurement object of the next measurement object classification, or n measurement objects, that have highest measurement results for a fourth preset duration, of multiple measurement objects of the next measurement object classification each is taken as the measurement object of the next measurement object classification; and m measurement objects, that have lowest measurement results, of multiple measurement objects of the next measurement object classification each is taken as the measurement object of the next measurement object classification, or m measurement objects, that have lowest measurement results for a fifth preset duration, of multiple measurement objects of the next measurement object classification each is taken as the measurement object of the next measurement object classification.

Optionally, the multiple measurement object classifications include at least two of: a network device, a frequency point, a cell or a beam.

Optionally, measurement includes at least one of: received power measurement, received signal quality measurement, received signal strength measurement or signal interference level measurement.

Optionally, the sender 722 is specifically be configured to send the measurement configuration information to the terminal device through an RRC layer, a MAC layer or a physical layer.

Figure 8:
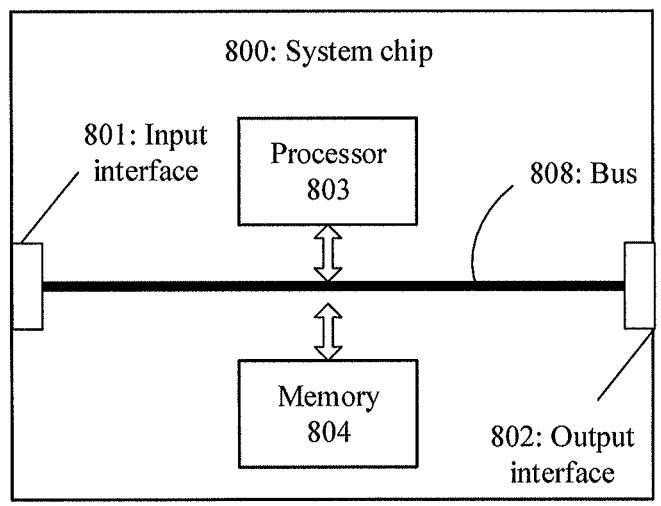
FIG. 8 is a schematic structure diagram of a system chip according to an embodiment of the disclosure.

FIG. 8 is a schematic structure diagram of a system chip according to an embodiment of the disclosure. The system chip 800 of FIG. 8 includes an input interface 801, an output interface 802, at least one processor 803 and a memory 804. The input interface 801, the output interface 802, the processor 803 and the memory 804 are connected through a bus 805. The processor 803 is configured to execute a code in the memory 804. When the code is executed, the processor 803 may implement the method executed by the network device in FIG. 2. The bus 805 is only an example of a connection manner. In the embodiment of the disclosure, the input interface 801, the output interface 802, the processor 803 and the memory 804 may also be connected in another manner. There are no limits made herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A measurement method, comprising:
   receiving, by a terminal device, measurement configuration information sent by a network device, wherein the measurement configuration information comprises a plurality of cells to be measured and a plurality of beams to be measured, and each of the plurality of cells comprises at least one of the plurality of beams;
   measuring, by the terminal device, the plurality of cells and the plurality of beams according to the measurement configuration information, wherein the plurality of cells is associated with a first measurement object classification, and the plurality of beams is associated with a second measurement object classification;
   writing by the terminal device, a measurement result of a first cell of the plurality of cells and a measurement result of a first beam of the plurality of beams into a measurement report according to a writing sequence of the first measurement object classification and the second measurement object classification, wherein the measurement result of the first cell and the measurement result of the first beam satisfies a reporting condition which is preset, and the writing sequence of the first measurement object classification has priority over the writing sequence of the second measurement object classification; and
   sending, by the terminal device, the measurement report to the network device.

2. The method of claim 1, wherein the measurement result comprises at least one of:
   a result of received signal power measurement, a result of received signal quality measurement or a result of signal interference level measurement.

3. The method of claim 1, wherein
   the measurement configuration information is configured by the network device through a Radio Resource Control (RRC).

4. The method of claim 1, wherein the reporting condition comprises a first reporting condition and a second reporting condition, the plurality of cells corresponds to the first reporting condition, and the plurality of beams corresponds to the second reporting condition; and
   the measurement result of the first cell satisfies the first reporting condition, and the measurement result of the first beam satisfies the second reporting condition.

5. The method of claim 4, wherein the writing, by the terminal device, a measurement result of a first cell of the plurality of cells and a measurement result of a first beam of the plurality of beams into a measurement report according to a writing sequence of the first measurement object classification and the second measurement object classification comprises:
   after writing the measurement result of the first cell into the measurement report, writing, by the terminal device, the measurement result of the first beam comprised in the first cell into the measurement report.

6. The method of claim 1, further comprising:
   not writing, by the terminal device, a measurement result of a second cell of the plurality of cells into the measurement report, wherein the measurement result of the second cell does not satisfy the first reporting condition;
   in response that the measurement result of the second cell does not write into the measurement report, not writing, by the terminal device, a result of the plurality of beams comprised in the second cell into the measurement report.

7. A measurement method, comprising:
   sending, by a network device, measurement configuration information to a terminal device, wherein the measurement configuration information comprises a plurality of cells to be measured and a plurality of beams to be measured, and each of the plurality of cells comprises at least one of the plurality of beams; and
   receiving, by the network device, the measurement report sent by the terminal device;
   wherein the measurement configuration information is used for the terminal device to measure the plurality of cells and the plurality of beams according to the measurement configuration information, the plurality of cells is associated with a first measurement object classification, and the plurality of beams is associated with a second measurement object classification, so that the terminal device writes a measurement result of a first cell of the plurality of cells and a measurement result of a first beam of the plurality of beams into a measurement report according to a writing sequence of the first measurement object classification and the second measurement object classification, wherein the measurement result of the first cell and the measurement result of the first beam satisfies a reporting condition which is preset, and the writing sequence of the first measurement object classification has priority over the writing sequence of the second measurement object classification.

8. The method of claim 7, wherein the reporting condition comprises a first reporting condition and a second reporting condition, the plurality of cells corresponds to the first reporting condition, and the plurality of beams corresponds to the second reporting condition; and
   the measurement result of the first cell satisfies the first reporting condition, and the measurement result of the first beam satisfies the second reporting condition.

9. The method of claim 7, wherein the measurement result comprises at least one of:
   a result of received signal power measurement, a result of received signal quality measurement or a result of signal interference level measurement.

10. The method of claim 7, wherein
    the measurement configuration information is configured by the network device through a Radio Resource Control (RRC) signaling.

11. A terminal device, comprising:
    a memory storing instructions;
    a processor for executing the instructions to:
    receive measurement configuration information sent by a network device, wherein the measurement configuration information comprises a plurality of cells to be measured and a plurality of beams to be measured, and each of the plurality of cells comprises at least one of the plurality of beams;
    measure the plurality of cells and the plurality of beams according to the measurement configuration information, wherein the plurality of cells is associated with a first measurement object classification, and the plurality of beams is associated with a second measurement object classification;
    write a measurement result of a first cell of the plurality of cells and a measurement result of a first beam of the plurality of beams into a measurement report according to a writing sequence of the first measurement object classification and the second measurement object classification, wherein the measurement result of the first cell and the writing sequence of the first measurement object classification has priority over the writing sequence of the second measurement object classification; and send the measurement report to the network device.

12. The terminal device of claim 11, wherein the measurement comprises result at least one of:
a result of received signal power measurement, a result of received signal quality measurement or a result of signal interference level measurement.

13. The terminal device of claim 11, wherein
the measurement configuration information is configured by the network device through a Radio Resource Control (RRC) signaling.

14. The device of claim 11, wherein the reporting condition comprises a first reporting condition and a second reporting condition, the plurality of cells corresponds to the first reporting condition, and the plurality of beams corresponds to the second reporting condition; and
the measurement result of the first cell satisfies the first reporting condition, and the measurement result of the first beam satisfies the second reporting condition.

15. The device of claim 14, wherein the processor is further configured to:
after writing the measurement result of the first cell into the measurement report, write the measurement result of the first beam comprised in the first cell into the measurement report.

16. The device of claim 11, the processor is further configured to:
not write a measurement result of a second cell of the plurality of cells into the measurement report, wherein the measurement result of the second cell does not satisfy the first reporting condition;
in response that the measurement result of the second cell does not write into the measurement report, not write a result of the plurality of beams comprised in the second cell into the measurement report.

17. A network device, comprising:
a memory storing instructions;
a processor for executing the instructions to:
send measurement configuration information to a terminal device, wherein the measurement configuration information comprises a plurality of cells to be measured and a plurality of beams to be measured, and each of the plurality of cells comprises at least one of the plurality of beams; and
receive the measurement report sent by the terminal device;
wherein the measurement configuration information is used for the terminal device to measure the plurality of cells and the plurality of beams according to the measurement configuration information, the plurality of cells is associated with a first measurement object classification, and the plurality of beams is associated with a second measurement object classification; so that the terminal device writes a measurement result of a first cell of the plurality of cells and a measurement result of a first beam of the plurality of beams into a measurement report according to a writing sequence of the first measurement object classification and the second measurement object classification, wherein the measurement result of the first cell and the measurement result of the first beam satisfies a reporting condition which is preset, and the writing sequence of the first measurement object classification has priority over the writing sequence of the second measurement object classification.

18. The device of claim 17, wherein the reporting condition comprises a first reporting condition and a second reporting condition, the plurality of cells corresponds to the first reporting condition, and the plurality of beams corresponds to the second reporting condition; and
the measurement result of the first cell satisfies the first reporting condition, and the measurement result of the first beam satisfies the second reporting condition.

19. The device of claim 17, wherein the measurement result comprises at least one of:
a result of received signal power measurement, a result of received signal quality measurement or a result of signal interference level measurement.

20. The device of claim 17, wherein
the measurement configuration information is configured by the network device through a Radio Resource Control (RRC) signaling.

* * * * *